United States Patent
Kurushima et al.

(10) Patent No.: US 8,737,104 B2
(45) Date of Patent: May 27, 2014

(54) SWITCHING POWER SUPPLY DEVICE

(75) Inventors: Hiroshi Kurushima, Tokyo (JP); Masato Matsubara, Tokyo (JP); Hitoshi Kidokoro, Tokyo (JP); Akihiro Suzuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/988,917

(22) PCT Filed: Jan. 17, 2011

(86) PCT No.: PCT/JP2011/050660
§ 371 (c)(1),
(2), (4) Date: May 22, 2013

(87) PCT Pub. No.: WO2012/098632
PCT Pub. Date: Jul. 26, 2012

(65) Prior Publication Data
US 2013/0242630 A1    Sep. 19, 2013

(51) Int. Cl.
*H02M 7/5387* (2007.01)

(52) U.S. Cl.
USPC .................................. 363/132; 315/219

(58) Field of Classification Search
USPC ............. 363/16–20, 21.02, 21.08, 34, 37, 58,
363/65, 89, 95, 97, 98, 127, 132;
323/222–225, 267, 271, 282–288;
315/224, 291, 237, 246, 349, 219
See application file for complete search history.

(56) References Cited

U.S. PATENT DOCUMENTS

| | | | | |
|---|---|---|---|---|
| 5,406,471 | A * | 4/1995 | Yamanaka | 363/124 |
| 6,078,144 | A * | 6/2000 | Twardzik | 315/209 R |
| 7,193,871 | B2 * | 3/2007 | Mashiko | 363/79 |
| 8,174,856 | B2 * | 5/2012 | Chapman | 363/132 |
| 8,488,340 | B2 * | 7/2013 | Zhang et al. | 363/21.07 |
| 2011/0037406 | A1 * | 2/2011 | Matsuzaki et al. | 315/276 |

FOREIGN PATENT DOCUMENTS

| | | | |
|---|---|---|---|
| JP | 1-166482 | U | 11/1989 |
| JP | 3054699 | * | 12/1998 |
| JP | 3054996 | U | 12/1998 |
| JP | 2004-254355 | * | 9/2004 |
| JP | 2004-254355 | A | 9/2004 |
| JP | 2006-187084 | A | 7/2006 |
| JP | 2007-318911 | A | 12/2007 |
| JP | 2008-271637 | A | 11/2008 |
| JP | 2009-268239 | A | 11/2009 |
| JP | 2010-166719 | A | 7/2010 |

* cited by examiner

*Primary Examiner* — Rajnikant Patel
(74) *Attorney, Agent, or Firm* — Sughrue Mion, PLLC (57) ABSTRACT

A switching power supply device includes: a chopper circuit that adjusts a DC voltage input through a reactor to a desired DC voltage by performing an on/off operation of a switching element; an inverter circuit that converts an output of the chopper circuit into a desired AC voltage; a first capacitor that is provided on a side of the inverter circuit relative to the switching element; a second capacitor that is provided on a side of the inverter circuit relative to the switching element; and a resistor that is in a resonant loop formed by three constituent elements that are the first capacitor, the second capacitor, and a wiring inductance between the chopper circuit and the inverter circuit, where the resistor is connected in series to the second capacitor and inserted between the DC bus-bars.

8 Claims, 5 Drawing Sheets

SWITCHING POWER SUPPLY DEVICE

CROSS REFERENCE TO RELATED APPLICATIONS

This application is a National Stage of International Application No. PCT/JP2011/050660, filed on Jan. 17, 2011, the contents of all of which are incorporated herein by reference in their entirety.

FIELD

The present invention relates to a switching power supply device that is applicable to a power supply device of a laser machining device, for example.

BACKGROUND

As one of conventional power-factor correction methods for a switching power supply device that includes a converter circuit, a chopper circuit, an inverter circuit, and the like, there is a high power-factor converter method in which a smoothing capacitor is mounted on the output side of a boost chopper circuit.

In a switching power supply device using this method, on the output side of a boost chopper circuit, a surge absorbing capacitor intended for surge absorption in a switching element is often connected in parallel to a smoothing capacitor that smoothes a voltage. For example, in Patent Literature 1 mentioned below, a surge absorbing capacitor (a first capacitor) that prevents a phenomenon of output voltage ripples caused by resonant oscillations at the time of starting an operation is provided and connected in parallel to two smoothing capacitors (second and third capacitors) that constitute a π-type smoothing circuit through an inductance, and further a damping resistor is connected in series to the third capacitor.

CITATION LIST

Patent Literature

Patent Literature 1: Japanese Utility Model Application No. 3054996

SUMMARY

Technical Problem

In a plurality of capacitors used in a conventional chopper circuit, when a smoothing capacitor and a surge absorbing capacitor are compared with each other, it is common that the smoothing capacitor has a larger capacitance. In the circuit described in Patent Literature 1 mentioned above, a damping resistor is connected to a larger-capacitance smoothing capacitor.

However, a high current flows through the larger-capacitance smoothing capacitor when this smoothing capacitor is charged, and also a resonant current, caused by an inductance due to a wiring path between the smoothing capacitor and the surge absorbing capacitor and by a capacitance of the surge absorbing capacitor, is added to the smoothing capacitor. Therefore, there is a problem of increasing a loss in the damping resistor connected in series to the smoothing capacitor, and reducing efficiency. Furthermore, because the heat generation amount at the damping resistor is increased, a damping resistor having a high allowable-power has to be used. This leads to a problem of cost increase.

Meanwhile, it is also conceivable that no damping resistor is used in a circuit configuration. In this case, a resonant current to the smoothing capacitor is increased by using no damping resistor, and the smoothing capacitor itself generates more heat. Therefore, it is a necessary procedure to increase the number of smoothing capacitors used (the number of divisions) to disperse heat generated from the smoothing capacitors, for example. Accordingly, there is a problem of cost increase as well as size increase of a device.

The present invention has been achieved to solve the above problems, and an object of the present invention is to provide a switching power supply device that decreases a loss in a damping resistor, thereby suppressing efficiency reduction even when a capacitance of a smoothing capacitor is increased.

Solution to Problem

To solve the above problems and achieve the object according to an aspect of the present invention, a switching power supply device includes: a chopper circuit that adjusts a DC voltage input through a reactor to a desired DC voltage; an inverter circuit that converts an output of the chopper circuit into a desired AC voltage; a first capacitor that is inserted between DC bus-bars that connect the chopper circuit and the inverter circuit; a second capacitor that is connected in parallel to the first capacitor and has a larger capacitance value than the first capacitor; and a resistor that is inserted between the DC bus-bars and only connected to the first capacitor.

Advantageous Effects of Invention

According to the present invention, even when a capacitance of a smoothing capacitor is increased, a loss in a damping resistor can be decreased to suppress efficiency reduction.

BRIEF DESCRIPTION OF DRAWINGS

FIG. 2 depicts a current path when a switching element of a chopper circuit is turned on.

DESCRIPTION OF EMBODIMENTS

Exemplary embodiments of a switching power supply device according to the present invention will be explained below in detail with reference to the accompanying drawings. The present invention is not limited to the following embodiments.

First Embodiment

Figure 1:
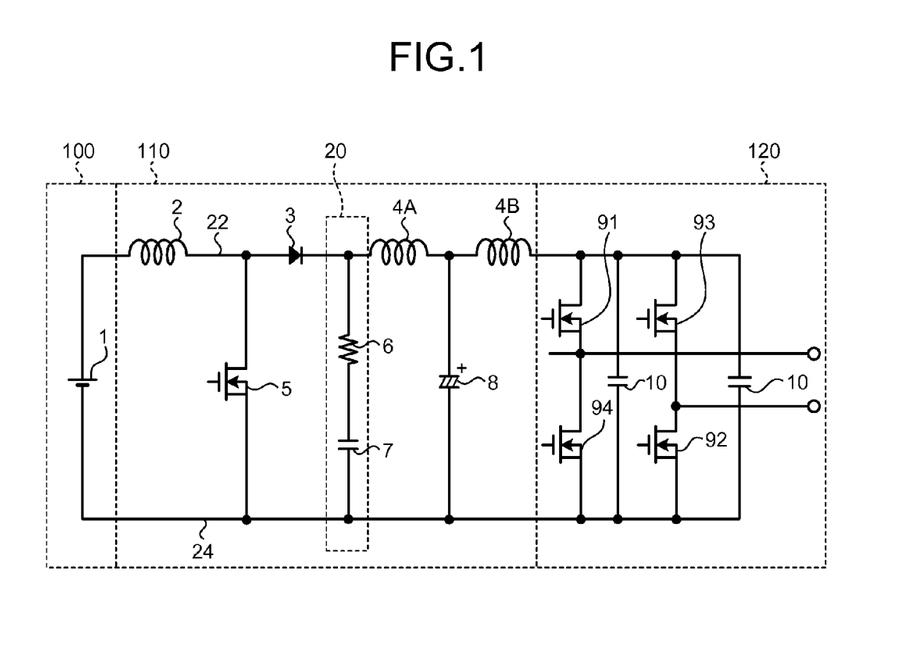
FIG. 1 is a circuit configuration example of a switching power supply device common to first and second embodiments.

FIG. 1 is a circuit configuration example of a switching power supply device common to respective embodiments described below. As shown in FIG. 1, the switching power supply device is divided into three circuit blocks that are a power supply circuit 100, a chopper circuit 110, and an inverter circuit 120. The power supply circuit 100 is a DC-power supply source. The chopper circuit 110 adjusts an input DC voltage to a desired DC voltage. The inverter circuit 120 converts an output of the chopper circuit 110 into a desired AC voltage.

The power supply circuit 100 includes a DC input power supply 1. The DC input power supply 1 is a general idea that includes: a rectifying circuit that rectifies an AC voltage; a converter that converts an AC voltage into a desired DC voltage; and a DC/DC converter that adjusts a DC voltage to a desired DC voltage.

The chopper circuit 110 includes a reactor 2, a diode 3, a switching element 5, a smoothing capacitor 8, and a surge absorbing circuit 20. The surge absorbing circuit 20 is configured by connecting a damping resistor 6 and a surge absorbing capacitor 7 in series. In the chopper circuit 110, between a DC bus-bar 22 that is a positive DC bus-bar and a DC bus-bar 24 that is a negative DC bus-bar, the switching element 5, the surge absorbing circuit 20, and the smoothing capacitor 8 are connected in parallel to the DC input power supply 1 in this order.

The inverter circuit 120 includes switching elements 91 to 94 and a surge absorbing capacitor 10. The switching elements 91 and 94 are connected to each other in series to constitute an arm for one phase. The switching elements 92 and 93 are connected to each other in series to constitute an arm for one phase. The respective arms are connected to each other in parallel between the DC bus-bars 22 and 24 to constitute a single-phase inverter circuit. The surge absorbing capacitor 10 is inserted between the DC bus-bars 22 and 24 corresponding to each of the arms.

In FIG. 1, a wiring inductance 4A indicated on the DC bus-bar 22 between the surge absorbing circuit 20 and the smoothing capacitor 8 is a wiring inductance that is generated when the surge absorbing circuit 20 and the smoothing capacitor 8 are being electrically connected. A wiring inductance 4B indicated on the DC bus-bar 22 between the smoothing capacitor 8 and the inverter circuit 120 is a wiring inductance that is generated when the smoothing capacitor 8 and the inverter circuit 120 are being electrically connected. While FIG. 1 only depicts wiring inductances on the positive DC bus-bar 22, wiring inductances that can be generated on the negative DC bus-bar 24 are also included.

Figure 2:
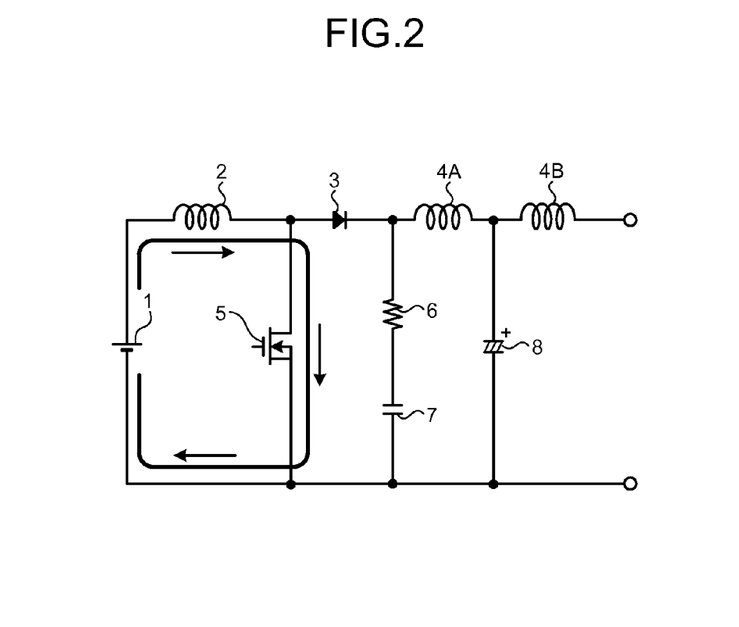
Figure 3:
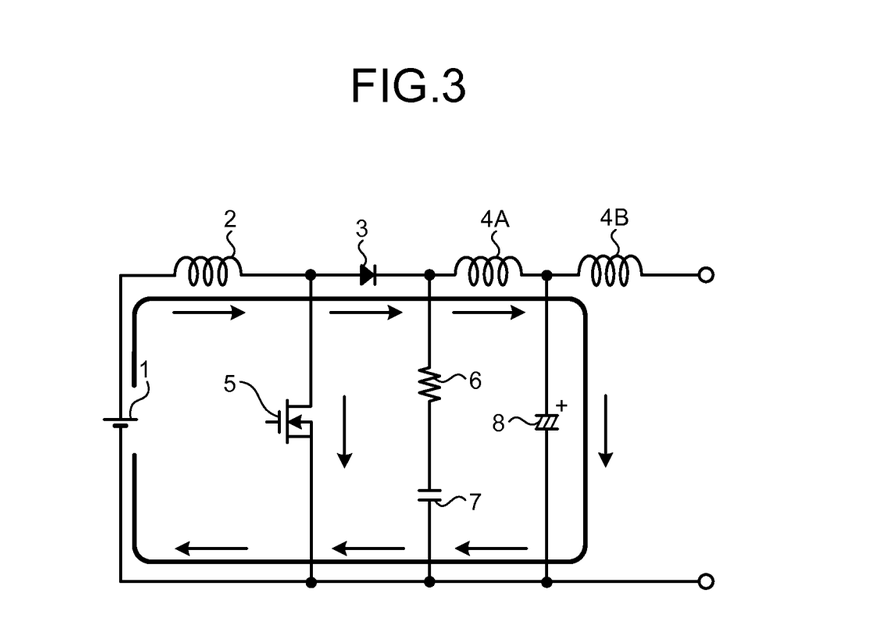
FIG. 3 depicts a current path when the switching element of the chopper circuit is being turned off.

Next, an operation of the switching power supply device according to a first embodiment will be explained with reference to FIG. 2. FIGS. 2 and 3 are explanatory diagrams of an operation of the chopper circuit 110 in the switching power supply device shown in FIG. 1. FIG. 2 depicts a current path when the switching element 5 is being turned on. FIG. 3 depicts a current path when the switching element 5 is being turned off.

When the switching element 5 is being turned on, a current flows along a path passing through a positive electrode of the DC input power supply 1→the reactor 2→the switching element 5→a negative electrode of the DC input power supply 1, as shown in FIG. 2. At this time, electromagnetic energy is accumulated in the reactor 2. In contrast, when the switching element 5 is being turned off, a current flows along a path passing through the positive electrode of the DC input power supply 1→the reactor 2→the diode 3→the wiring inductance 4A→the smoothing capacitor 8→the negative electrode of the DC input power supply 1, as shown in FIG. 3. The electromagnetic energy accumulated in the reactor 2 is a source for this current flow. When the sum of a voltage of the DC input power supply 1 and a voltage generated in the reactor 2 is higher than a terminal voltage of the smoothing capacitor 8, a current flows in the arrow direction. When the sum of these voltages is lower than the terminal voltage of the smoothing capacitor 8, a current flows in the direction reverse to the arrow direction.

The voltage generated in the reactor 2 can be controlled by changing an on/off time ratio that is a ratio between an on time and an off time of the switching element 5. Therefore, a current flowing through the reactor 2 and the terminal voltage of the smoothing capacitor 8 can be varied by controlling the on/off time ratio.

Figure 4:
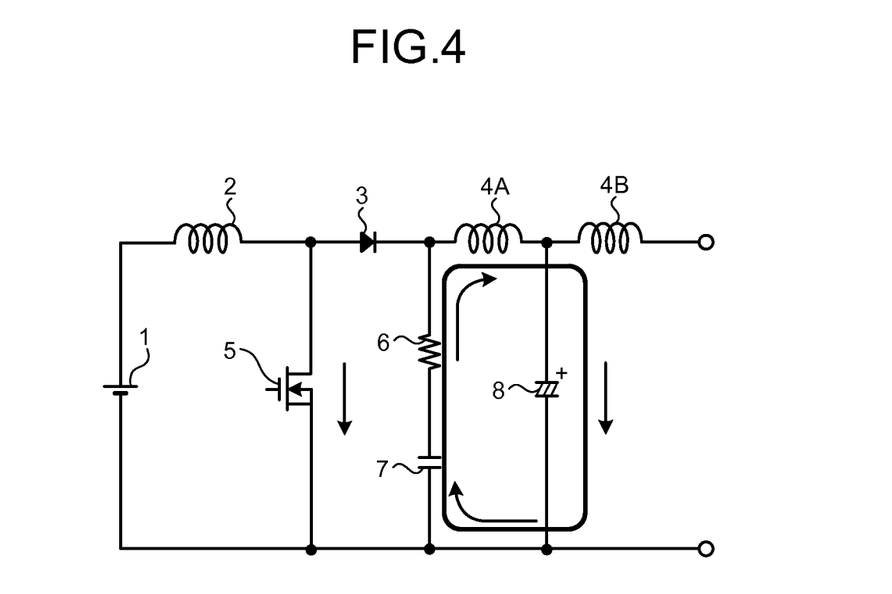
FIG. 4 is an explanatory diagram of a resonant current that can be generated by a surge absorbing capacitor and a wiring inductance.

Next, a resonant current that can be generated by the surge absorbing capacitor 7 and the wiring inductance 4A will be explained with reference to FIG. 4. FIG. 4 is an explanatory diagram of the resonant current.

As described above, a current that is temporally changed by turning the switching element 5 on/off flows through the DC bus-bars 22 and 24. The rate of change of this flowing current (di/dt) is changed according to a switching speed at which the switching element 5 is turned on/off. Therefore, as the switching speed becomes higher, the rate of change of the current becomes higher. Accordingly, the higher the switching speed of the switching element 5 becomes, the more the magnitude of the wiring inductance 4A between the smoothing capacitor 8 and the damping resistor 6 becomes non-negligible in terms of a circuit operation.

When the magnitude of the wiring inductance 4A is non-negligible, a resonant current as shown in FIG. 4 is increased. Where an inductance of the wiring inductance 4A is represented as L, a capacitance of the smoothing capacitor 8 is represented as $C_0$, and a capacitance of the surge absorbing capacitor 7 is represented as $C_1$, there is a relationship between $C_0$ and $C_1$ expressed as $C_0 \gg C_1$, and a resonant frequency fr is expressed as the following equation.

$$fr = 1/2\pi\sqrt{(LC_1)} \cdot \sqrt{\{1+(C_1/C_0)\}} \approx 1/2\pi\sqrt{(LC_1)} \quad (1)$$

As described above, when the magnitude of the wiring inductance 4A is non-negligible, a resonant current flows, which oscillates at the resonant frequency fr determined by the capacitance $C_1$ of the surge absorbing capacitor 7 and by the inductance L of the wiring inductance 4A as expressed by the above equation (1). The resonant current is added to a charging current for the smoothing capacitor 8.

Next, a role of the damping resistor 6 will be explained. When there is not the damping resistor 6, there is not any resistance component in the above resonant loop. Therefore, a very high resonant current flows through the smoothing capacitor 8. In contrast, when there is the damping resistor 6, a resistance component of the damping resistor 6 is added to the above resonant loop. Therefore, the magnitude of the resonant current can be restricted by the damping resistor 6. Accordingly, the resonant current to be added to the smoothing capacitor 8 can be decreased.

In the switching power supply device according to the present embodiment, the damping resistor 6 is inserted to be connected to the surge absorbing capacitor 7 in series. This insertion position also has a significant meaning as explained above in the section of "Solution to Problem". In a circuit of Patent Literature 1 described above, a damping resistor is inserted on the smoothing-capacitor side. This is equivalent to connecting the damping resistor 6 in series to the smoothing capacitor 8 in the circuit of the present application in FIGS. 2 to 4.

In a case where the damping resistor 6 is connected to the smoothing capacitor 8, the magnitude of the resonant current shown in FIG. 4 remains almost unchanged. However, on a charging-current path shown in FIG. 3, the damping resistor 6 restricts a charging current. Therefore, the magnitude of the damping resistor 6 cannot be very high. Meanwhile, when the resistance value of the damping resistor 6 is low, a current (a charging current) flowing through the damping resistor 6 is increased. Therefore, the heat generation amount at the damping resistor 6 is increased, and accordingly a high allowable-power damping resistor has to be used. Furthermore, when the resistance value of the damping resistor 6 is low, a resonant current is high. Therefore, there is a problem of impairing the ability to reduce the resonant current.

As described above, in the switching power supply device according to the first embodiment, a damping resistor is inserted on the side of a surge absorbing capacitor having a small capacitance value, instead of the side of a smoothing capacitor having a large capacitance value. Therefore, a resonant current that may be generated due to a wiring inductance can be restricted. As a result, a resonant current that may flow through the smoothing capacitor can be decreased, and it is possible to suppress heat generation in the smoothing capacitor due to the resonant current.

While an embodiment where the damping resistor 6 is inserted to the surge absorbing capacitor 7 has been explained in the first embodiment, the present invention is not limited to this case. For example, as shown in FIG. 1, in a case where the surge absorbing capacitor 10 is inserted between both ends of each of the arms constituting the inverter circuit 120; it is preferable to connect a damping resistor also to the surge absorbing capacitor 10 when the resonance is non-negligible. The resonance here is caused by the wiring inductance 4B between the inverter circuit 120 and the smoothing capacitor 8 and by the surge absorbing capacitor 10.

While an embodiment where the damping resistor 6 is inserted to the surge absorbing capacitor 7 has been explained in the first embodiment, the damping resistor 6 is not limited to being inserted to this type of surge absorbing capacitor. For example, in a case where a capacitor is inserted between DC bus-bars for a purpose other than surge absorption, and resonance caused by a wiring inductance between the capacitor and a smoothing capacitor is not negligible, it is preferable to insert a damping resistor to the capacitor, similarly to the surge absorbing capacitor. That is, in a case where in addition to a first capacitor that is a smoothing capacitor connected between DC bus-bars, there is a second capacitor connected between the DC bus-bars similarly to the first capacitor and having a smaller capacitance value than the first capacitor, an embodiment in which a damping resistor is connected in series to the second capacitor is also included in the scope of the present invention.

Figure 5:
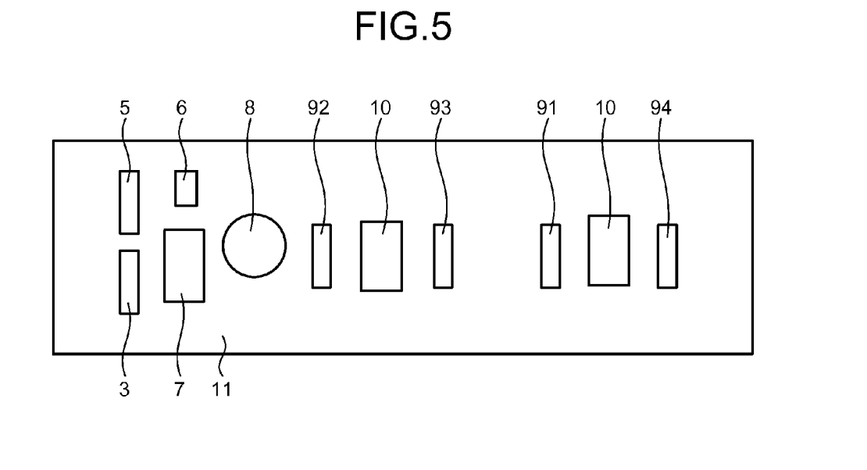
FIG. 5 is an example of an element arrangement on a circuit board of the switching power supply device according to the first embodiment.
Figure 6:
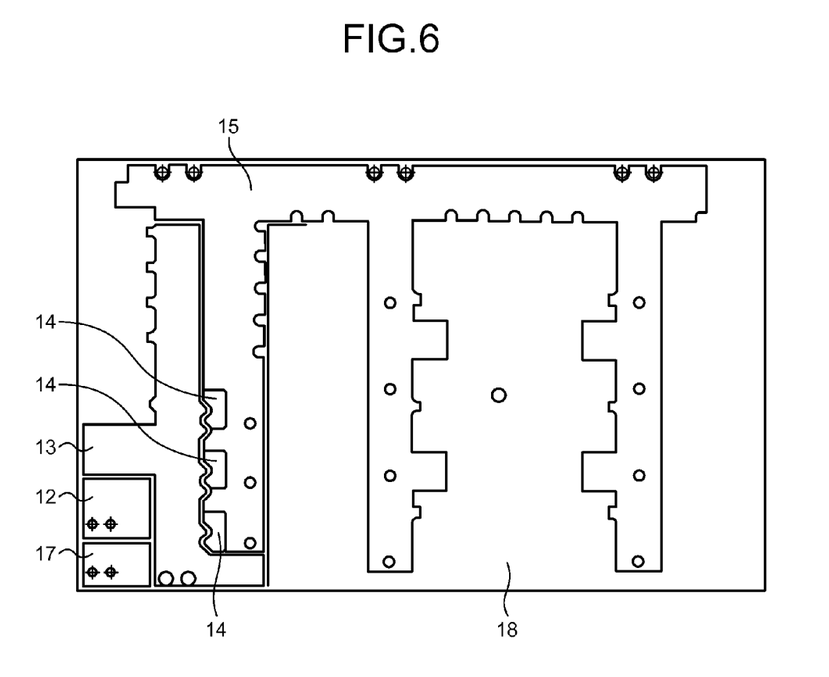
FIG. 6 is an example of a wiring pattern on a certain layer of a multilayer board for arranging elements shown in FIG. 5.
Figure 7:
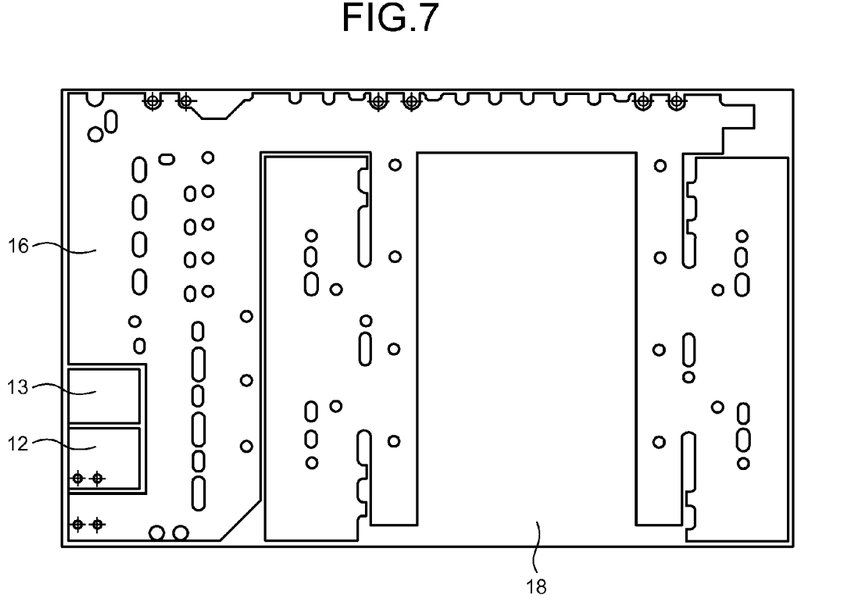
FIG. 7 is an example of a wiring pattern on a layer different from the layer of the multilayer board shown in FIG. 6.
Figure 8:
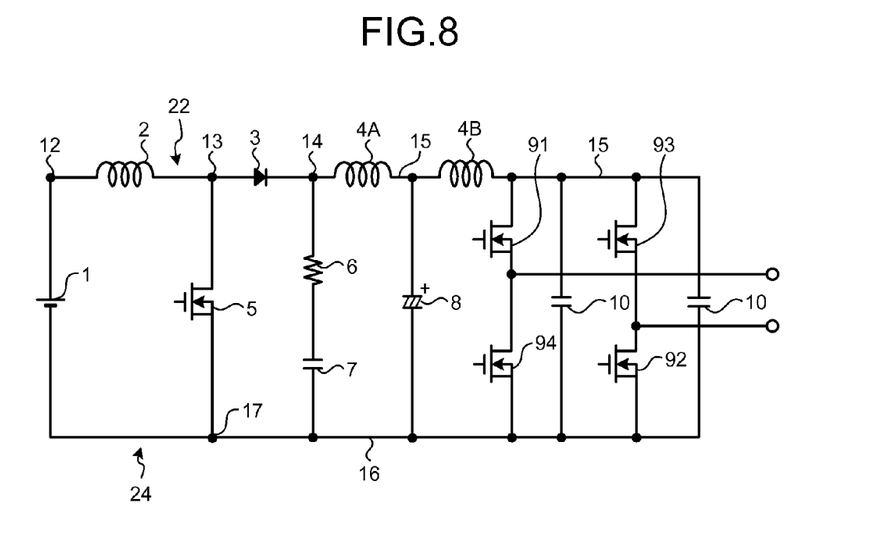
FIG. 8 depicts positions of wiring patterns shown in FIGS. 6 and 7 on the circuit diagram in FIG. 1.
Figure 9:
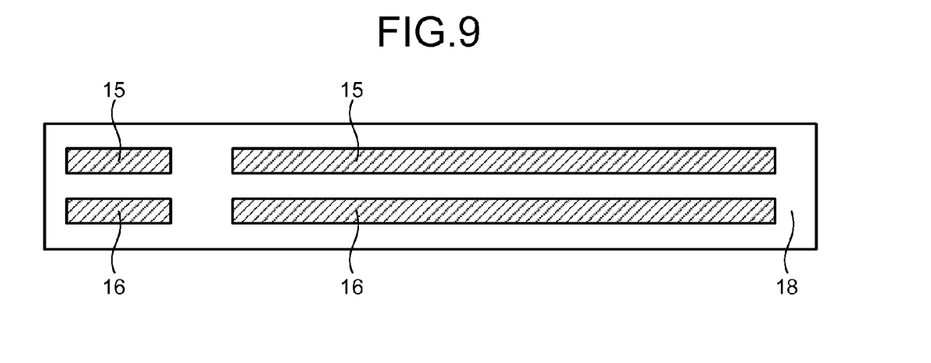
FIG. 9 schematically depicts a cross-sectional structure of a certain part of the multilayer board shown in FIGS. 6 and 7.

Next, an example of an element arrangement according to the first embodiment will be explained with reference to FIGS. 5 to 9. FIG. 5 is a top view of an example of an element arrangement on a circuit board of the switching power supply device according to the first embodiment. FIG. 6 is an example of a wiring pattern for arranging elements shown in FIG. 5 on a certain layer of a multilayer board. FIG. 7 is an example of a wiring pattern of a layer different from the layer shown in FIG. 6 (an adjacent upper or lower layer) on the multilayer board of FIG. 6. FIG. 8 depicts positions of the wiring patterns shown in FIGS. 6 and 7 on the circuit diagram in FIG. 1. FIG. 9 schematically depicts a cross-sectional structure of a certain part of the multilayer board shown in FIGS. 6 and 7.

As shown in FIG. 5, for example, respective elements shown in FIG. 1 are arranged on an uppermost surface of a multilayer board 11 having a plurality of layers. Reference numerals indicated in FIG. 5 correspond to those in FIG. 1. For example, in arranging circuit elements shown in FIG. 5, the multilayer board shown in FIGS. 6 and 7 is used. On the multilayer board in FIGS. 6 and 7, copper-foil patterns 12 to 17 are printed on an insulating material 18.

The copper-foil pattern 12 constitutes an electrode to which a positive electrode of the DC input power supply 1 and one end of the reactor 2 are connected (see the circuit diagram in FIG. 8). Similarly, the copper-foil pattern 13 constitutes an electrode to which the other end of the reactor 2, one end of the switching element 5, and an anode end of the diode 3 are connected. The copper-foil pattern 17 constitutes an electrode to which the other end of the switching element 5 and one end of the surge absorbing capacitor 7 are connected. While FIG. 6 depicts three copper-foil patterns 14, any two of the copper-foil patterns 14 are connected alternatively to one end of the damping resistor 6 and a cathode end of the diode 3. In copper-foil patterns shown in FIGS. 6 and 7, those denoted by the same reference numerals are electrically connected to each other by a via or the like that connects between layers. The copper-foil pattern 17 constituting an electrode and the copper-foil pattern 16 are also electrically connected to each other between layers.

As shown in FIG. 9, the copper-foil patterns 15 and 16 are printed to be parallel to each other with a circuit board interposed therebetween. In order to decrease a wiring inductance, it is necessary to (1) shorten the wiring length and (2) reduce a magnetic field generated by flowing of a current. By printing the copper-foil patterns 15 and 16 as shown in FIG. 9, a reciprocating current (a returning current) can flow between the copper-foil patterns 15 and 16. In this case, there is an opposite relationship between the direction of a magnetic field generated by a current flowing through the copper-foil pattern 15 and the direction of a magnetic field generated by a current flowing through the copper-foil pattern 16. These magnetic fields can cancel each other out. Therefore, when the copper-foil patterns 15 and 16 are arranged as shown in FIG. 9, the wiring inductances 4A and 4B can be decreased. As a result, the resonant frequency expressed by the above equation (a) can be shifted to a higher side, and a resonant current can be reduced to decrease a loss in the damping resistor 6. Furthermore, because the resonant current is decreased, a resistance value of the damping resistor 6 can be made smaller, and a loss in the entire circuit can be decreased.

According to a board configuration in FIG. 5, a chopper circuit and an inverter circuit are arranged on the same board, the surge absorbing capacitor 7 is arranged near the smoothing capacitor 8, and the surge absorbing capacitor 10 is arranged near the switching elements 91 to 94. Therefore, each wiring length can be shortened, and the wiring inductances 4A and 4B can be decreased.

In the board configuration in FIG. 5, the reactor 2 is not mounted. However, in a case where the reactor 2 can be downsized and light-weighted, the reactor 2 may be mounted on the board. In this case, the switching power supply device can be downsized in its entirety.

Figure 10:
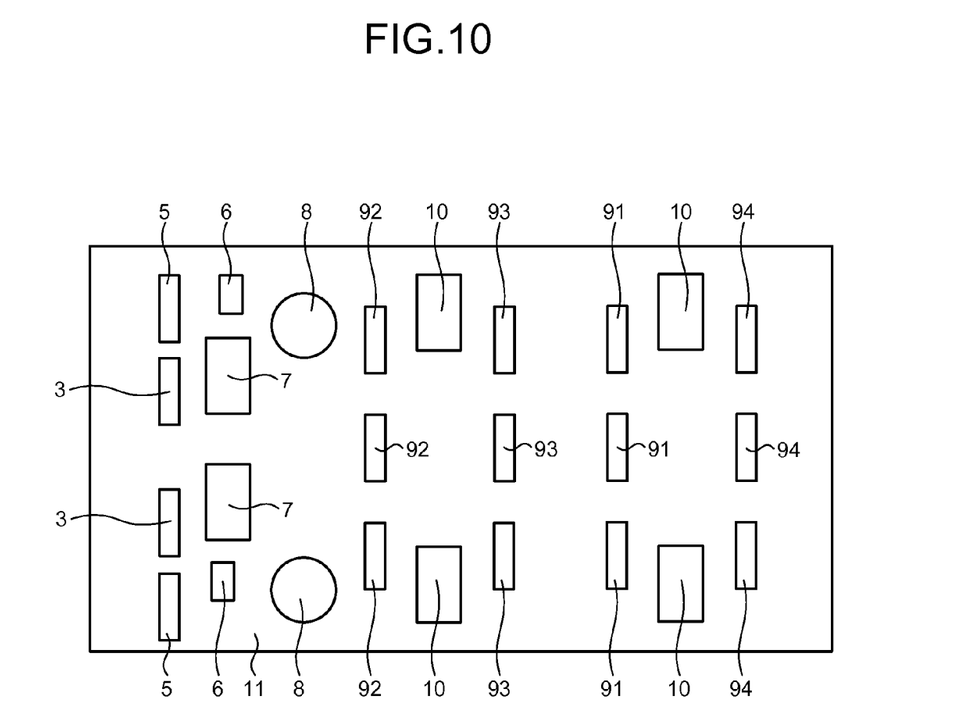
FIG. 10 is a top view of an example of an element arrangement different from that of FIG. 5.

FIG. 5 depicts a configuration in which one of each element is arranged on a multilayer board. However, in a case of increasing a capacitance of the switching power supply device, a plurality of elements may be arranged in parallel, for example as shown in FIG. 10 (three each of the switching elements 91 to 94 in the inverter circuit are arranged in parallel, and two each of other elements are arranged in parallel). In a case where it is desired to increase a capacitance of the smoothing capacitor 8, a plurality of capacitors arranged on the board as shown in FIG. 10 can be connected in parallel. However, it is also assumed that the capacitors cannot be arranged on the board. In such a case, the smoothing capacitor 8 can be connected to an external capacitor by a connector or a terminal block. However, in a case of employing such a configuration, it is desirable to arrange the external capacitor near a printed circuit board in order to decrease a wiring inductance.

As described above, in the switching power supply device according to the first embodiment, a damping resistor to be inserted in a resonant loop is connected to a surge absorbing capacitor instead of a smoothing capacitor. Therefore, even when a capacitance of the smoothing capacitor is increased, a loss in the damping resistor can be decreased to suppress efficiency reduction. Furthermore, even when the capacitance of the smoothing capacitor is increased, an effect of eliminating the need to take a special countermeasure against heat generation, such as increasing the number of smoothing capacitors used, is obtained.

Second Embodiment

In a second embodiment, a switching element included in a chopper circuit and an inverter circuit of the switching power supply device is explained. A typical switching element used in the chopper circuit is a semiconductor transistor element (such as an insulated-gate bipolar transistor (IGBT) and a metal oxide semiconductor filed-effect transistor (MOSFET)) of a silicon (Si) material. A typical switching element used in the inverter circuit is a switching element configured by connecting a semiconductor transistor element (such as an IGBT and a MOSFET) of an Si material and a semiconductor diode element also of an Si material in inverse parallel. The techniques explained in the first embodiment can be used in a chopper circuit and an inverter circuit that include these typical switching elements.

Meanwhile, the techniques in the first embodiment described above are not limited to a switching element formed of a silicon material. It is certainly possible to use a switching element of a silicon carbide (SiC) material, which is receiving attention in recent years, in the chopper circuit and the inverter circuit, in place of the silicon material.

Silicon carbide has characteristics of being able to be used at a high temperature. Therefore, when a switching element of a silicon carbide material is used as a switching element included in the chopper circuit and the inverter circuit, an allowable operation temperature of a switching element module can be increased. Accordingly, it is possible to increase a switching speed by increasing a carrier frequency.

On the other hand, the switching element of a silicon carbide material has properties of a low surge-voltage resistance. Therefore, when the switching speed is increased, the rate of change of the current (di/dt) becomes higher and the switching element receives a strong influence of a wiring inductance. Accordingly, it is difficult to execute a control by simply increasing the carrier frequency.

However, according to the techniques in the first embodiment, a surge absorbing capacitor is arranged in a vicinity of the respective switching elements in a chopper circuit and an inverter circuit, thereby shortening the wiring length. Furthermore, a multilayer board is used, and therefore one wire (for example, a positive DC bus-bar) and the other wire (for example, a negative DC bus-bar) are constituted by respective wires from adjacent upper and lower layers of the multilayer board. Further, a reciprocating current flows between these wires. Therefore, it is possible to decrease a surge voltage itself. Accordingly, it is possible to overcome the disadvantage of the switching element of a silicon carbide material, which has properties of a low surge-voltage resistance. It is also possible to fully utilize the characteristics of the switching element of a silicon carbide material, which are to be able to be used at a high temperature.

Silicon carbide (SiC) is an example of a semiconductor referred to as "wide bandgap semiconductor" because of its wider bandgap properties than those of silicon (Si). In addition to silicon carbide, a semiconductor formed of a gallium nitride-based material or diamond also belongs to the wide bandgap semiconductor. Their properties are similar to those of silicon carbide in many aspects. Therefore, a configuration using the wide bandgap semiconductor other than silicon carbide also constitutes the scope of the present invention.

A transistor element and a diode element that are formed of the wide bandgap semiconductor as described above have a high voltage resistance and a high allowable current density. Therefore, it is possible to downsize the transistor element and the diode element. Accordingly, by using these downsized transistor element and diode element, it is possible to downsize a semiconductor module having these elements incorporated therein.

Furthermore, the transistor element and diode element formed of the wide bandgap semiconductor have a high heat resistance. Therefore, it is possible to downsize a heat sink, and accordingly it is possible to further downsize the switching element module.

Further, the transistor element and diode element formed of the wide bandgap semiconductor have a low power loss. Therefore, it is possible to achieve high efficiency of the switching element and the diode element, and accordingly it is possible to achieve high efficiency of the switching element module.

The configuration described in the first and second embodiments is only an example of the configuration of the present invention. The configuration can be combined with other well-known techniques, and it is needless to mention that the present invention can be configured while modifying it without departing from the scope of the invention, such as omitting a part of the configuration.

INDUSTRIAL APPLICABILITY

As described above, the present invention is useful as a switching power supply device that decreases a loss in a damping resistor, thereby suppressing efficiency reduction.

REFERENCE SIGNS LIST

1 DC input power supply
2 reactor (chopper circuit)
3 diode (chopper circuit)
4A, 4B wiring inductance
5 switching element (chopper circuit)
6 damping resistor
7 surge absorbing capacitor (chopper circuit)
8 smoothing capacitor
10 surge absorbing capacitor (inverter circuit)
11 multilayer board
12 to 17 copper-foil pattern
18 insulating material
20 surge absorbing circuit (chopper circuit)

22, 24 DC bus-bar
91 to 94 switching element (inverter circuit)
100 power supply circuit
110 chopper circuit
120 inverter circuit

The invention claimed is:

1. A switching power supply device comprising:
a chopper circuit that adjusts a DC voltage input through a reactor to a desired DC voltage by performing an on/off operation of a switching element;
an inverter circuit that converts an output of the chopper circuit into a desired AC voltage;
a first capacitor that is provided on a side of the inverter circuit relative to the switching element and that is inserted between DC bus-bars that connect the chopper circuit and the inverter circuit;
a second capacitor that is provided on a side of the inverter circuit relative to the switching element and that is connected in parallel to the first capacitor and has a smaller capacitance value than the first capacitor; and
a resistor that is in a resonant loop formed by three constituent elements that are the first capacitor, the second capacitor, and a wiring inductance between the chopper circuit and the inverter circuit, where the resistor is connected in series to the second capacitor and inserted between the DC bus-bars.

2. The switching power supply device according to claim 1, wherein the second capacitor is a smoothing capacitor that smoothes an output of the chopper circuit.

3. The switching power supply device according to claim 1, wherein the first capacitor is a surge absorbing capacitor that is arranged close to a chopper diode.

4. The switching power supply device according to claim 1, wherein the first capacitor is a surge absorbing capacitor that is arranged close to an arm that constitutes the inverter circuit.

5. The switching power supply device according to claim 1, wherein the chopper circuit and the inverter circuit are arranged on a same board.

6. The switching power supply device according to claim 1, wherein the chopper circuit and the inverter circuit are constituted by a multilayer board including two or more layers, and one of the DC bus-bars and the other are constituted by respective wires from adjacent upper and lower layers of the multilayer board.

7. The switching power supply device according to claim 1, wherein respective switching elements of the chopper circuit and the inverter circuit are formed of a wide bandgap semiconductor.

8. The switching power supply device according to claim 7, wherein the wide bandgap semiconductor is a semiconductor using silicon carbide, a gallium nitride-based material, or diamond.

* * * * *